United States Patent
Mohanty et al.

(10) Patent No.: US 11,829,234 B2
(45) Date of Patent: Nov. 28, 2023

(54) AUTOMATICALLY CLASSIFYING CLOUD INFRASTRUCTURE COMPONENTS FOR PRIORITIZED MULTI-TENANT CLOUD ENVIRONMENT RESOLUTION USING ARTIFICIAL INTELLIGENCE TECHNIQUES

(71) Applicant: Dell Products L.P., Round Rock, TX (US)

(72) Inventors: Bijan Kumar Mohanty, Austin, TX (US); Divya Maddi, Round Rock, TX (US); Hung T. Dinh, Austin, TX (US); Vikram Ramdev Bokka, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 17/579,104

(22) Filed: Jan. 19, 2022

(65) Prior Publication Data
US 2023/0229543 A1    Jul. 20, 2023

(51) Int. Cl.
G06F 11/07    (2006.01)
G06N 3/04    (2023.01)
G06F 9/50    (2006.01)

(52) U.S. Cl.
CPC ........ *G06F 11/0781* (2013.01); *G06F 9/5038* (2013.01); *G06N 3/04* (2013.01)

(58) Field of Classification Search
CPC ...... G06F 11/0781; G06F 9/5038; G06N 3/04
See application file for complete search history.

(56) References Cited

U.S. PATENT DOCUMENTS

| | | | |
|---|---|---|---|
| 10,768,920 B2 | 9/2020 | Fontoura et al. | |
| 10,868,737 B2 | 12/2020 | Huang et al. | |
| 10,944,647 B2 | 3/2021 | Tidemann et al. | |
| 10,979,314 B2 | 4/2021 | Tidemann et al. | |
| 2019/0163594 A1* | 5/2019 | Hayden | G06F 11/3024 |
| 2020/0026589 A1* | 1/2020 | Ghosh | G06F 11/0793 |
| 2021/0064458 A1* | 3/2021 | Rathinasabapathy | G06F 11/0781 |

(Continued)

FOREIGN PATENT DOCUMENTS

EP    3674466 B1 *    5/2021    ............. D06F 33/00

*Primary Examiner* — Matthew M Kim
*Assistant Examiner* — Kyle Emanuele
(74) *Attorney, Agent, or Firm* — Ryan, Mason & Lewis, LLP (57) ABSTRACT

Methods, apparatus, and processor-readable storage media for automatically classifying cloud infrastructure components for prioritized multi-tenant cloud environment resolution using artificial intelligence techniques are provided herein. An example computer-implemented method includes obtaining historical data pertaining to a multi-tenant cloud environment; training one or more artificial intelligence techniques, using at least a portion of the obtained historical data, for classifying cloud infrastructure components for prioritizing incident-related resolution; classifying one or more cloud infrastructure components, within the multi-tenant cloud environment and associated with one or more server-related issues, into one or more of multiple resolution priority classes; and performing one or more automated actions based at least in part on the classifying of the one or more cloud infrastructure components.

20 Claims, 8 Drawing Sheets

(56) References Cited

U.S. PATENT DOCUMENTS

2021/0303381 A1\* 9/2021 Baldassarre .......... G06F 11/008
2023/0096734 A1\* 3/2023 Anthonappa ....... G06F 11/2273
　　　　　　　　　　　　　　　　　　　714/33

\* cited by examiner

```
#Import necessary libraries
%matplotlib inline
import pandas as pd
import numpy as np
import matplotlib.pyplot as plt
import seaborn as sns
import tensorflow as tf
print(tf.__version__)
from sklearn import preprocessing import warnings
from sklearn.model_selection import train_test_split
warnings.filterwarnings("ignore")

# reading the historical data file into pandas dataframe
operations_df = pd.read_csv("operations_status.csv")  # Read the historical cloud operations status data

# OrderNumber doesn't play any role in the target variable.
operations_df = operations_df.drop("VirtualMachineID" , axis=1)
```

400

```
# Convert the Categorical values to one-hot encoded
operations_df = pd.get_dummies(operations_df, columns=['Customer'])
operations_df = pd.get_dummies(operations_df, columns=['Application'])
operations_df = pd.get_dummies(operations_df, columns=['DeploymentType'])
operations_df = pd.get_dummies(operations_df, columns=['Availability'])
```

FIG. 5

```
# Split Train and Test data sets
#First get the independent variables and dependent variable separated
features = [col for col in operations_df.columns if col != 'PriorityClass']

X_train, X_test, y_train, y_test = train_test+rsplit(operations_df[features], operations_df['PriorityClass'],
                                                    test_size=.3, random_state=42)

# Normalize and Scale the data
from sklearn.preprocessing import StandardScaler scaler = StandardScaler().fit(X_train)

Scale the train set
X_trainScaled = scaler.transform(X_train)

# Scale the test set
X_testScaled = scaler.transform(X_test)
```

```
Using Tensorflow Keras to create the Dense Neural Network model for multi-class classification from tensorflow.keras import Sequential
from tensorflow.keras.layers import Dense

# Initialize the constructor
model = Sequential()

# Add on first hidden layer for the 19 input variables
model.add(Dense(32, input_shape = (19,), activation='relu' , kernel_initializer='normal'))

# second hidden layer
model.add(Dense(16, activation='relu' , kernel_initializer='normal'))

# Add an output layer with one neuron and no activation
model.add(Dense(1))

# set the loss function and optimizer
model.compile(loss='categorical_crossentropy', optimizer='adam' , metrics = 'accuracy')
```

FIG. 8

```
# Train the model with the training data
history = model.fit(X_trainScaled, y_train.values, validation_split=0.2,
                epochs=100, batch_size=500, verbose=1)

# Evaluate the loss value of the model using Test data
loss = model.evaluate(X_testScaled, y_test, verbose=False)

# Predict the class of priority of the VM from the model
y_predict = model.predict(X_testScaled)
```

AUTOMATICALLY CLASSIFYING CLOUD INFRASTRUCTURE COMPONENTS FOR PRIORITIZED MULTI-TENANT CLOUD ENVIRONMENT RESOLUTION USING ARTIFICIAL INTELLIGENCE TECHNIQUES

FIELD

The field relates generally to information processing systems, and more particularly to techniques for data management using such systems.

BACKGROUND

Cloud hosting has become a significant part of infrastructure architecture. Multi-tenant hosting, wherein infrastructure is shared among multiple customers, is a common approach in public cloud offerings. In a multi-tenant model, a physical server hosts virtual machines (VMs) or containers from different customers, wherein the VMs and/or containers are used for hosting different applications with different architectures. For example, while one VM or container may host a single instance non-production application of one customer, another VM or container may host a high availability-enabled (HA-enabled) production application from another customer. While both runtimes can be on the same host, the importance and/or priority of the runtime engines may vary. If the host fails, such a failure causes multiple tenant systems to go down, potentially resulting in a high priority incident for each customer, which can lead to a race for operational attention by a limited resource pool.

Using conventional cloud environment resolution techniques, addressing runtime engine issues typically does not involve a specific ordering (e.g., because all customer incidents are often assigned the same level of priority). Determining a resolution order using such conventional techniques, therefore, can often involve human estimations and/or arbitrary selection, which can result in cost-intensive delays and outages.

SUMMARY

Illustrative embodiments of the disclosure provide techniques for automatically classifying cloud infrastructure components for prioritized multi-tenant cloud environment resolution using artificial intelligence techniques. An exemplary computer-implemented method includes obtaining historical data pertaining to a multi-tenant cloud environment, and training one or more artificial intelligence techniques, using at least a portion of the obtained historical data, for classifying cloud infrastructure components for prioritizing incident-related resolution. The method also includes classifying one or more cloud infrastructure components, within the multi-tenant cloud environment and associated with one or more server-related issues, into one or more of multiple resolution priority classes, and performing one or more automated actions based at least in part on the classifying of the one or more cloud infrastructure components.

Illustrative embodiments can provide significant advantages relative to conventional cloud environment resolution techniques. For example, problems associated with cost-intensive delays and outages are overcome in one or more embodiments through automatically classifying cloud infrastructure components to prioritize multi-tenant cloud environment resolution using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
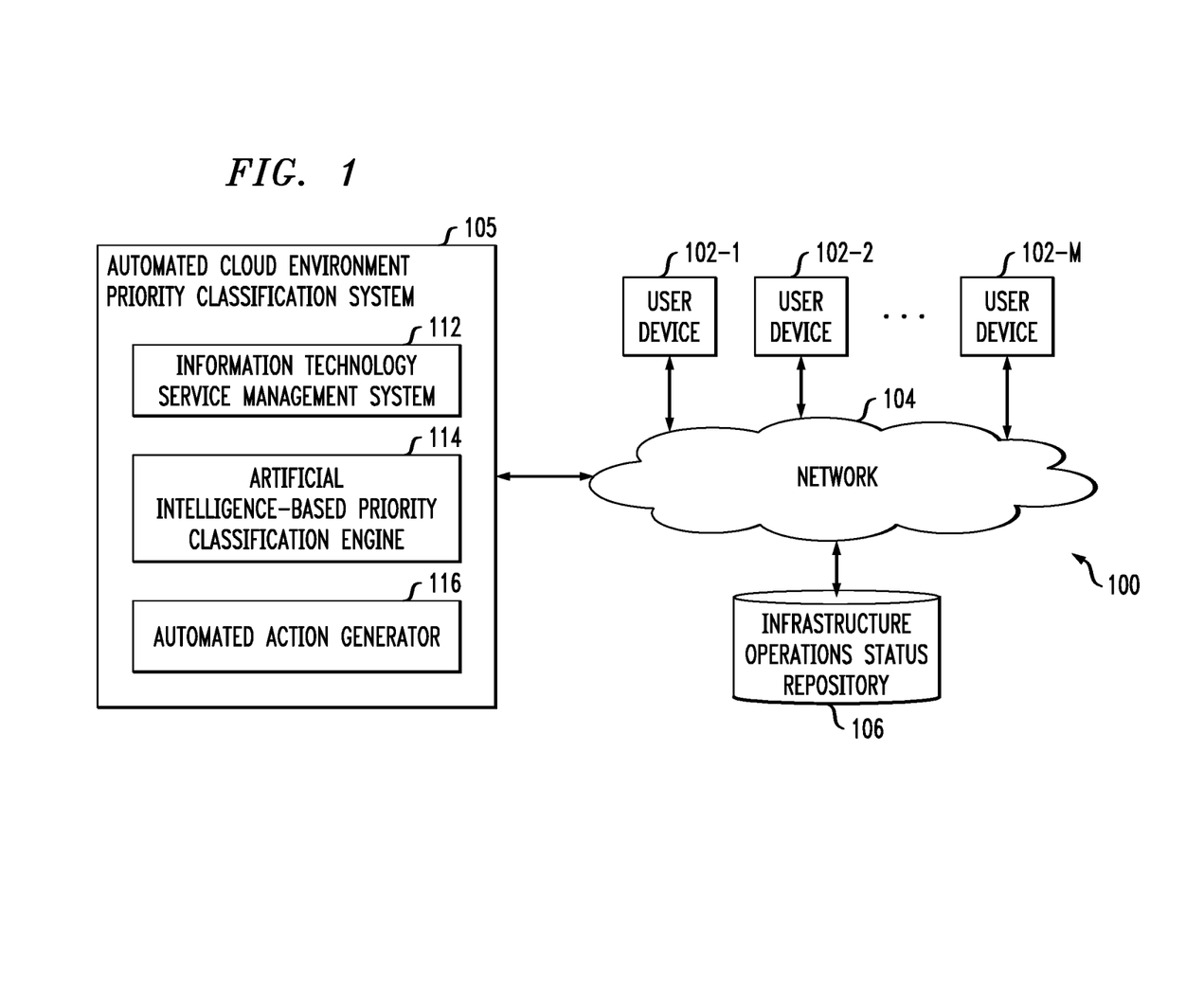
FIG. 1 shows an information processing system configured for automatically classifying cloud infrastructure components for prioritized multi-tenant cloud environment resolution using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated cloud environment priority classification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated cloud environment priority classification system 105 can have an associated infrastructure operations status repository 106 configured to store data pertaining to multi-tenant cloud environment information, which comprise, for example, runtime and/or compute engines (e.g., VMs, containers), user/customer information, type of applications hosted, architecture types, etc.

The infrastructure operations status repository 106 in the present embodiment is implemented using one or more storage systems associated with automated cloud environment priority classification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated cloud environment priority classification system 105 are one or more input-output devices, which illustratively comprise keyboards, displays or other types of input-output devices in any combination. Such input-output devices can be used, for example, to support one or more user interfaces to automated cloud environment priority classification system 105, as well as to support communication between automated cloud environment priority classification system 105 and other related systems and devices not explicitly shown.

Additionally, automated cloud environment priority classification system 105 in the FIG. 1 embodiment is assumed to be implemented using at least one processing device. Each such processing device generally comprises at least one processor and an associated memory, and implements one or more functional modules for controlling certain features of automated cloud environment priority classification system 105.

More particularly, automated cloud environment priority classification system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated cloud environment priority classification system 105 to communicate over the network 104 with the user devices 102, and illustratively comprises one or more conventional transceivers.

The automated cloud environment priority classification system 105 further comprises information technology service management system 112, artificial intelligence-based priority classification engine 114, and automated action generator 116.

It is to be appreciated that this particular arrangement of elements 112, 114 and 116 illustrated in the automated cloud environment priority classification system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically classifying incidents for prioritized multi-tenant cloud environment resolution using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated cloud environment priority classification system 105 and infrastructure operations status repository 106 can be on and/or part of the same processing platform and/or system (such as depicted, for example, in FIG. 2).

An exemplary process utilizing elements 112, 114 and 116 of an example automated cloud environment priority classification system 105 in computer network 100 will be described in more detail with reference to the flow diagram of FIG. 9.

Accordingly, at least one embodiment includes automatically classifying incidents for prioritized multi-tenant cloud environment resolution using artificial intelligence techniques. As further detailed herein, such an embodiment includes automatically predicting and/or determining the class or priority of a given virtual environment on a host by leveraging one or more artificial intelligence techniques and training such techniques with multi-dimensional historical data that can include, for example, the type of application (e.g., production, non-production, etc.), single instance versus HA, user/customer information, number of runtime engine instances, etc. For example, in one or more embodiments, a classification-based machine learning algorithm is implemented to extract features from historical data and accurately classify the priority of a given runtime engine (e.g., a VM, container, etc.) on an affected host. Such an embodiment can accordingly include addressing runtime engines in an appropriate and/or efficient order, thus improving use of and/or optimizing operational resources and enhancing customer satisfaction.

In at least one embodiment, automated classification of incidents can subsequently be leveraged to generate resolution priority scoring based on one or more factors (e.g., landscape environment (production versus development, for example) availability of HA for affected system, physical versus virtual server (physical servers typically take more time to restart for example), contractual service level agreements (SLAs), total contract value (which can affect the amount of credit paid for breached SLAs, for example), customer sentiment, proximity to go-live activities, peak business hours, etc.

Also, one or more embodiments include utilizing historical multi-tenant cloud infrastructure metadata such as, for example, VM-related metadata, container-related metadata, hosted application type information, customer-related metadata, etc. Such metadata can be used to train one or more artificial intelligence techniques, which can then be used to process input data related to multi-tenant cloud incidents to classify and/or group VMs into categories. For example, such metadata can be used to train a multi-layer perceptron (MLP) and/or other type of deep neural network to predict and/or determine the class of each runtime engine (e.g., VM, container, etc.). Such classifications are then used for generating a resolution prioritization and/or an order for addressing the outage scenario. Accordingly, and as further detailed herein, at least one neural network can be applied as a classification model to predict the class or priority of each runtime engine based on a variety of features such as noted above.

Such an artificial intelligence-based classification can facilitate resolving issues for hosts with the highest categorization class first (e.g., resolving issues for virtual machines running on a physical server during the time of an outage of the physical server). This way, the initial response as well resolution time for these servers and tenants can be expedited without human bias for managing mission-critical systems. Additionally, in one or more embodiments, different classifications and/or categories of incidents can correspond to different levels of priority and/or severity, and such classes and/or categories can have different definitions and associated response time parameters.

At least one embodiment includes conducting and/or performing one or more data engineering steps, which can include acquiring various relevant metadata (such as, for example, detailed above) and extracting therefrom features or independent variables such as, e.g., customer information, sentiment information, application information, architecture information, and/or other attributes related to the customer and application hosted. Such variables can be extracted and filtered to create a dataset that can be used to train one or more artificial intelligence techniques (e.g., a classification-based deep learning model) for predicting incident class and/or category.

Figure 2:
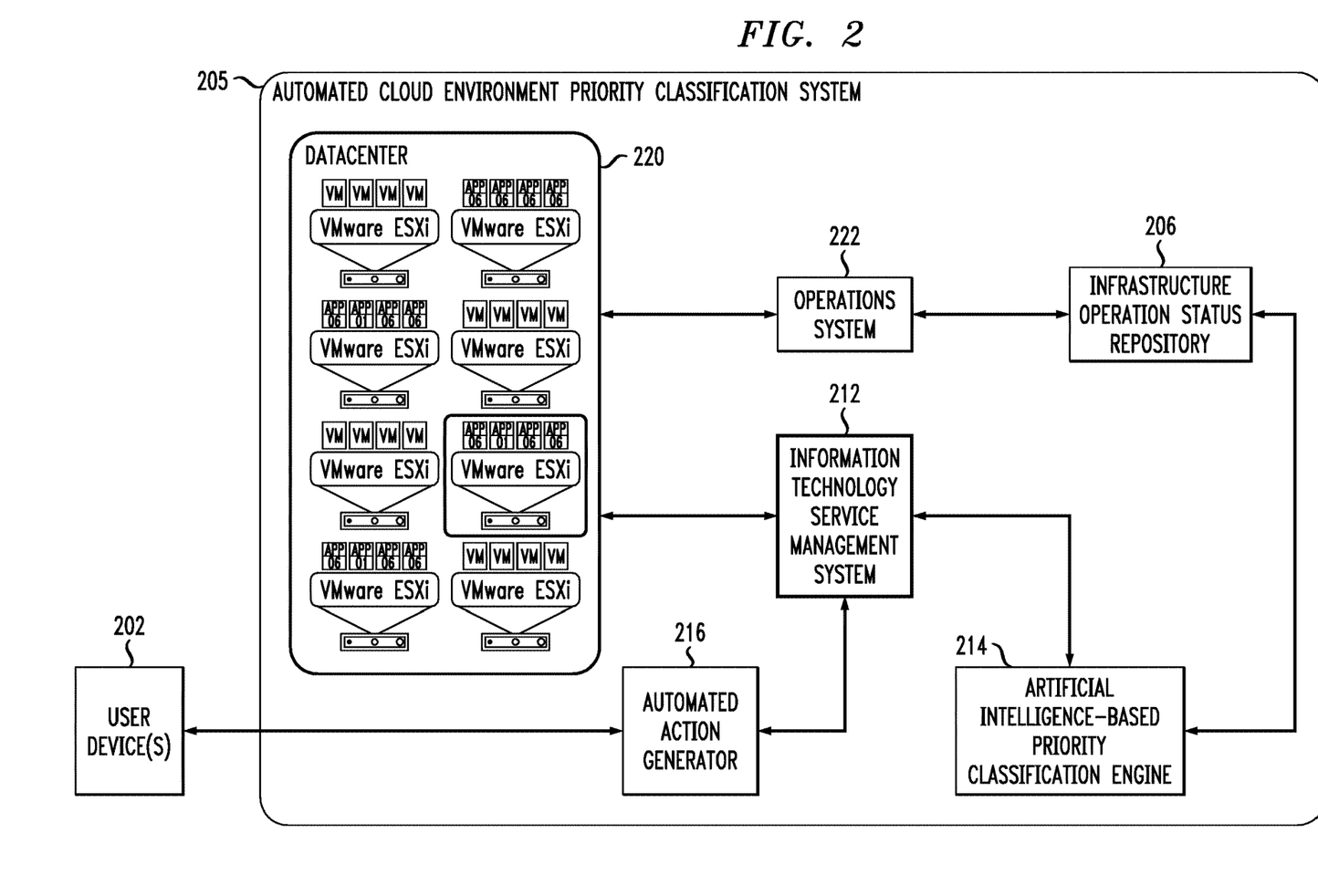
FIG. 2 shows example component architecture of an illustrative embodiment.

FIG. 2 shows example component architecture of an illustrative embodiment. By way of illustration, FIG. 2 depicts user device(s) 202 and automated cloud environment priority classification system 205, which includes datacenter 220, an operations system 222, information technology service management (ITSM) system 212, artificial intelligence-based priority classification engine 214, automated action generator 216, and infrastructure operations status repository 206. With respect to datacenter 220, in the example depiction of FIG. 2, each rectangle with three circles represents at least one underlying physical device, each middle layer (above the afore-mentioned rectangle) marked "VMWare ESXi" represents a "host," and the smaller boxes above the hosts represent VMs which may belong to multiple tenants (that is, end users). Accordingly, datacenter 220 generally depicts an example shared infrastructure in a multi-tenant environment.

By way of further example and illustration, when a multi-tenant shared piece of infrastructure (e.g., datacenter 220) such as ESXi host, underlying physical device, load balancers, network goes down, an incident ticket gets created in the ITSM system 212 (such as, for example, SNOW, JIRA, etc.). Each of the users have a sub-task, and all of the operations data (e.g., the environment and/or landscape of the server, fines to be paid if a user system goes down, etc.) are available in operations system 222. Also, in such an embodiment as depicted in FIG. 2, infrastructure operations status repository 206 contains historical operational data (derived, e.g., from operations system 222) pertaining, for example, to the affected runtime/compute engines (VM(s) and/or container(s)), the users, the type(s) of applications hosted, the architecture (e.g., HA enabled or not) and the class these compute engines fell under for priority processing. Data engineering and data analysis are carried out to determine and/or understand features and data elements that will be influencing the class value, such that only those features and data elements are filtered for storage. Infrastructure operations status repository 206 also contains fulfillment order status change date/time information as an order progresses through the supply chain, services delivery and provisioning systems. Sample data elements can be stored in infrastructure operations status repository 206 and used for training the model in artificial intelligence-based priority classification engine 214.

With respect to the infrastructure operations status repository 206, historical operations data can often serve as an effective indicator for the classification of virtual machines for prioritization in attention with a high degree of accuracy. Accordingly, one or more embodiments include building a data repository to contain historical operational data including, for example, the affected runtime/compute engines (VM, container, etc.), user/customer information, type of applications hosted, architecture (HA enabled or not) the class(es) that compute engines fell under for priority processing, etc. In at least one embodiment, data engineering and data analysis, as further detailed herein, can be carried out to understand one or more features and one or more data elements that can influence the class value such that only those data elements are filtered for storage. This repository (e.g., infrastructure operations status repository 206) can also, for example, contain fulfillment order status change dates/times as orders progress through a supply chain and/or services delivery and provisioning systems. Accordingly, various types of data elements can be stored in such a repository and used for training one or more models.

Also, with respect to the artificial intelligence-based priority classification engine 214, such an element is responsible for predicting the priority class of a virtual machine (affected by an outage) during a host failure. This engine can be used, for example, by an operations team and/or system to plan support by addressing higher priority class runtime components prior to lower priority class runtime components. In one or more embodiments, such an engine leverages a supervised learning mechanism and trains the model with the historical operations data containing the priority class assigned to the VMs in one or more past outages. One or more important and/or predetermined features can be extracted from at least one dataset, wherein such features can include identification of the application, user/customer, and deployment type, as well as information pertaining to the availability (HA or non-HA) of the applications hosted by the given VM or container. During a training phase, at least a portion of these features are fed into the model as the independent variable and the actual priority class in the dataset is designated as the dependent/target value. On receiving a VM or container with the details of the application hosted and customer of that application, the trained model can be used to predict the priority class.

In one or more embodiments, this engine utilizes a deep neural network by building at least one dense, multi-layer neural network to act as a multi-class classifier.

As also depicted in FIG. 2, the prediction(s) generated by artificial intelligence-based priority classification engine 214 can be passed through ITSM system 212 to automated action generator 216, which generates a notification (pertaining to the prediction and/or one or more related resolution actions) to user device(s) 202.

Figure 3:
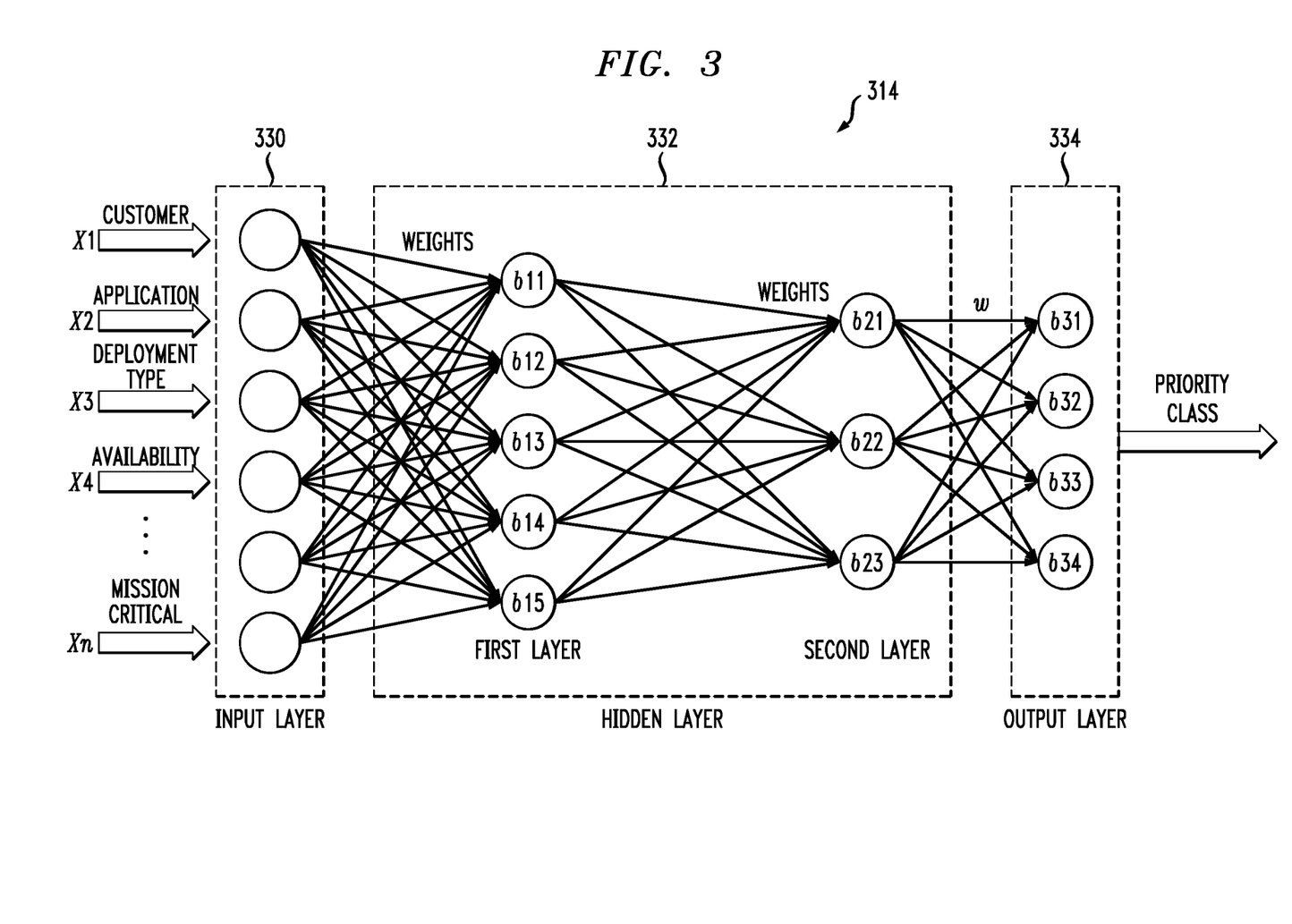
FIG. 3 shows architecture of an example dense artificial neural network-based (ANN-based) multi-class classifier implemented to predict priority class in an illustrative embodiment.

FIG. 3 shows architecture of an example dense ANN-based multi-class classifier implemented to predict priority class in an illustrative embodiment. By way of illustration, FIG. 3 depicts example dense ANN-based multi-class classifier 314, which includes an input layer 330, a hidden layer 332 with one or more (in this case, two) hidden layers there within, and an output layer 334. In at least one embodiment, input layer 330 includes a number of neurons that matches the number of input/independent variables. In the FIG. 3 example, the hidden layer 332 includes two layers (a first layer and a second layer) and the neuron on each layer depends upon the number of neurons in the input layer 330. The output layer 334, in the FIG. 3 example, contains four neurons (e.g., one for each priority class), as this is a multi-class classification model, meaning that the output is one of the four possible classes (e.g., P1, P2, P3 or P4).

Although there are five neurons/nodes shown in the first hidden layer and three neurons/nodes shown in the second hidden layer of example dense ANN-based multi-class classifier 314, those values can depend, in one or more embodiments, upon the total number of neurons in the input layer. By way of example, the number of neurons/nodes in the first hidden layer can be calculated based on an algorithm of matching the power of two to the number of input nodes. For example, if the number of input variables is 19, the number of neurons falls in the range of $2^5$. That means that the first layer will have $2^5=32$ neurons. The second layer, in such an example, can then contain $2^4=16$ neurons. If there will be a third layer, that third layer would include $2^3=8$ neurons.

Also, in one or more embodiments, the neurons in the hidden layers and the output layer contain an activation function which drives if the given neuron will fire or not. In the example dense ANN-based multi-class classifier 314 depicted in FIG. 3, a rectified linear unit (ReLU) activation function is used in both hidden layers. Considering that this example model is being architected to behave as a multi-class classifier, the output neurons can use a SoftMax activation function.

Additionally, considering that this example is a dense neural network, each node will connect with each other. Each connection will have a weight factor and the nodes will have a bias factor. In one or more embodiments, these weight and bias values are set randomly by the neural network, wherein such values can be started, for example, as 1 or 0 for all values. Each neuron/node can perform a linear calculation by combining the multiplication of each input variable (X1, X2 . . . ) with their weight factor, and then adding the bias of the neuron. The formula for this calculation can be shown as follows: ws11=X1.w1+X2.w2+ . . . +b11, wherein ws11 is the weighted sum of the neuron1 of the first layer of hidden layer 332, X1, X2, etc., are the input values to the model, w1, w2, etc. represent the weight values applied to the connections to neuron1, and b11 represents the bias value of neuron1 of the first layer of hidden layer 332. It should also be appreciated that, in the example embodiment depicted in FIG. 3, b12 represents the bias value of neuron2 of the first layer of hidden layer 332, b13 represents the bias value of neuron3 of the first layer of hidden layer 332, b14 represents the bias value of neuron4 of the first layer of hidden layer 332, b15 represents the bias value of neurons of the first layer of hidden layer 332, b21 represents the bias value of neuron1 of the second layer of hidden layer 332, b22 represents the bias value of neuron2 of the second layer of hidden layer 332, b23 represents the bias value of neuron3 of the second layer of hidden layer 332, b31 represents the bias value of neuron1 of the output layer 334, b32 represents the bias value of neuron2 of the output layer 334, b33 represents the bias value of neuron3 of the output layer 334, and b34 represents the bias value of neuron4 of the output layer 334.

Referring again to ws11 noted above, this weighted sum is input to an activation function (e.g., ReLU) to compute the value of the activation function. Similarly, weighted sum and activation function values of all other neurons in the layer can be calculated, and these values are then fed to the neurons of the next layer. The same process can then be repeated in the next layer of neurons until the values are fed to the neuron of the output layer, which is where the weighted sum is also calculated and compared to the actual target value. Depending upon the difference, the loss value can be calculated.

This pass through of the neural network is a forward propagation which calculates the error and drives a backpropagation through the network to minimize the loss or error at each neuron of the network. Considering that the error or loss is generated by all neurons in the network, backpropagation goes through each layer from back to forward, and attempts to minimize the loss by using gradient descent-based optimization mechanism. Considering that the neural network in one or more embodiments is used as a regressor, such an embodiment can include using the loss function as "categorical_crossentropy," Adam (adaptive moment estimation) as the optimization algorithm, and "accuracy" as the metrics value. As used herein, categorical crossentropy refers to a loss function that is used in multi-class classification tasks, which can include tasks wherein an example can only belong to one out of many possible categories, and the model must decide which one.

The result of this backpropagation can include adjusting the weight and bias values at each connection and neuron level, respectively, to reduce the error or loss. Additionally, once all observations of the training data are passed through the neural network, an epoch is completed. Another forward propagation is then initiated with the adjusted weight and bias values, which are considered as epoch2, and the same process of forward and backpropagation is repeated in the subsequent epochs. This process of repeating the epochs results in the reduction of loss (e.g., close to zero), which, at given point, results in the neural network being considered sufficiently trained for prediction.

As depicted in the example illustrations of FIG. 4 through FIG. 8, one or more embodiments can be implemented using Keras with Tensorflow backend, Python language, Pandas, Numpy and ScikitLearn libraries.

Figure 4:
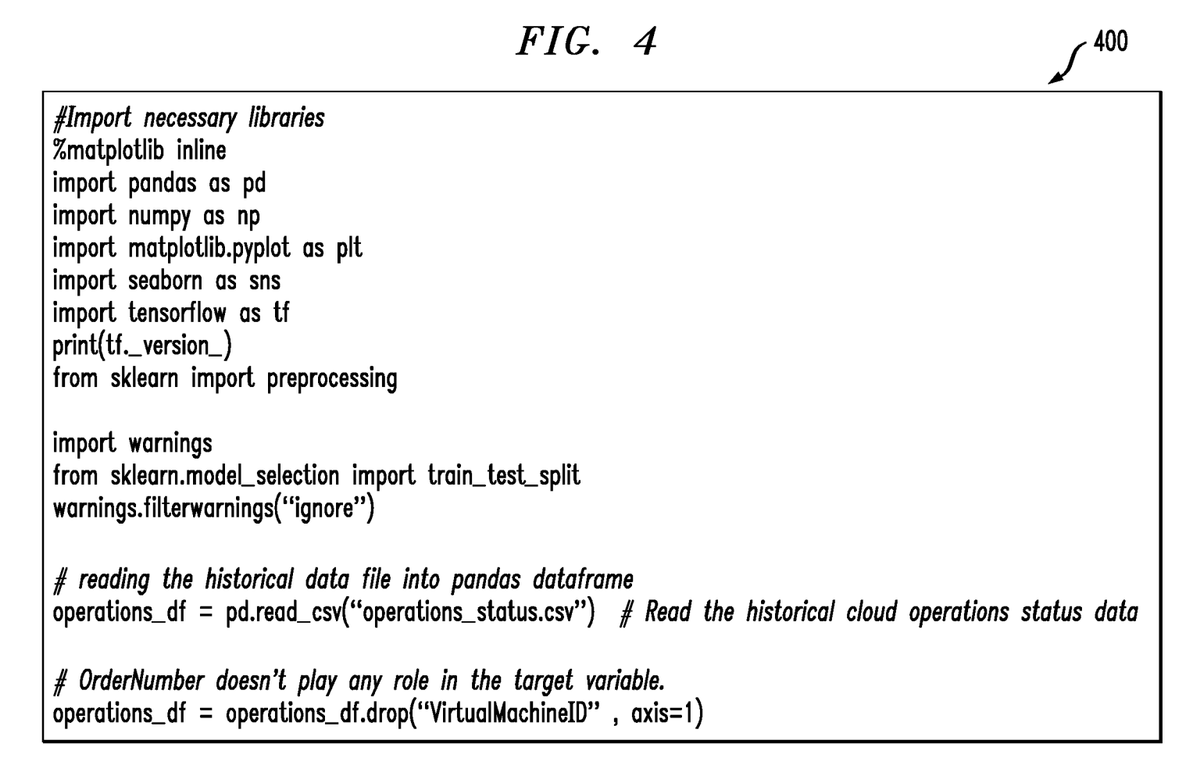
FIG. 4 shows an example code snippet for implementing data preprocessing techniques in an illustrative embodiment.

FIG. 4 shows an example code snippet for implementing data preprocessing techniques in an illustrative embodiment. In this embodiment, example code snippet 400 is executed by or under the control of at least one processing system and/or device. For example, the example code snippet 400 may be viewed as comprising a portion of a software implementation of at least part of automated cloud environment priority classification system 105 of the FIG. 1 embodiment. The example code snippet 400 illustrates reading a dataset from a historical infrastructure operations status repository and generating a Pandas data frame, which contains columns including independent variable column(s) and the dependent/target variable column. Additionally, such pre-processing of data includes handling any null or missing values in the columns. Null and/or missing values in numerical columns can be replaced, for example, by the median value of that column. After performing the initial data analysis by creating one or more univariate and bivariate plots of these columns, the importance and influence of each columns can be determined and/or understood. Columns (e.g., Virtual Machine ID), which are deemed to have little or no role or influence on the classification of priority (i.e., target variable) can be dropped and/or removed.

It is to be appreciated that this particular example code snippet shows just one example implementation of preprocessing techniques, and alternative implementations of the process can be used in other embodiments.

Figure 5:
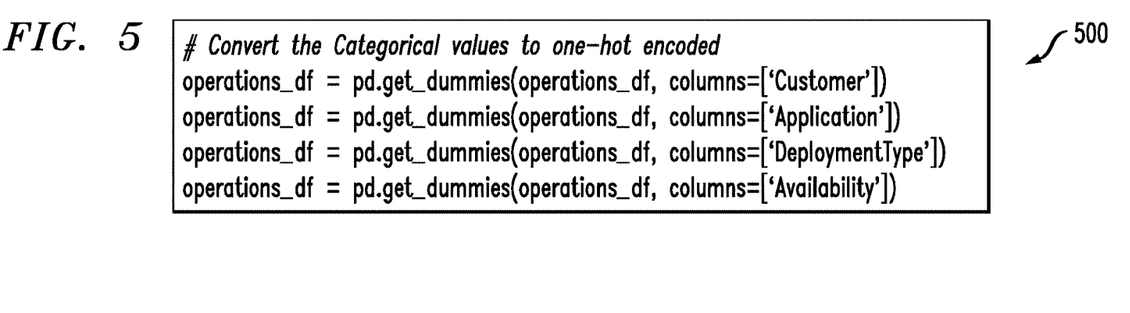
FIG. 5 shows an example code snippet for converting categorical values to encoded values in an illustrative embodiment.

FIG. 5 shows an example code snippet for converting categorical values to encoded values in an illustrative embodiment. In this embodiment, example code snippet 500 is executed by or under the control of at least one processing system and/or device. For example, the example code snippet 500 may be viewed as comprising a portion of a software implementation of at least part of automated cloud environment priority classification system 105 of the FIG. 1 embodiment.

The example code snippet 500 illustrates encoding textual categorical values in one or more columns. For example, values such as customer name, application name, deployment type, etc., must be encoded for use with the one or more artificial intelligence techniques detailed herein. Such encoding, as depicted in example code snippet 500, can be achieved by using one-hot encoding or dummy variable encoding (e.g., using the get_dummies function of pandas).

It is to be appreciated that this particular example code snippet shows just one example implementation of converting categorical values to encoded values, and alternative implementations of the process can be used in other embodiments.

Figure 6:
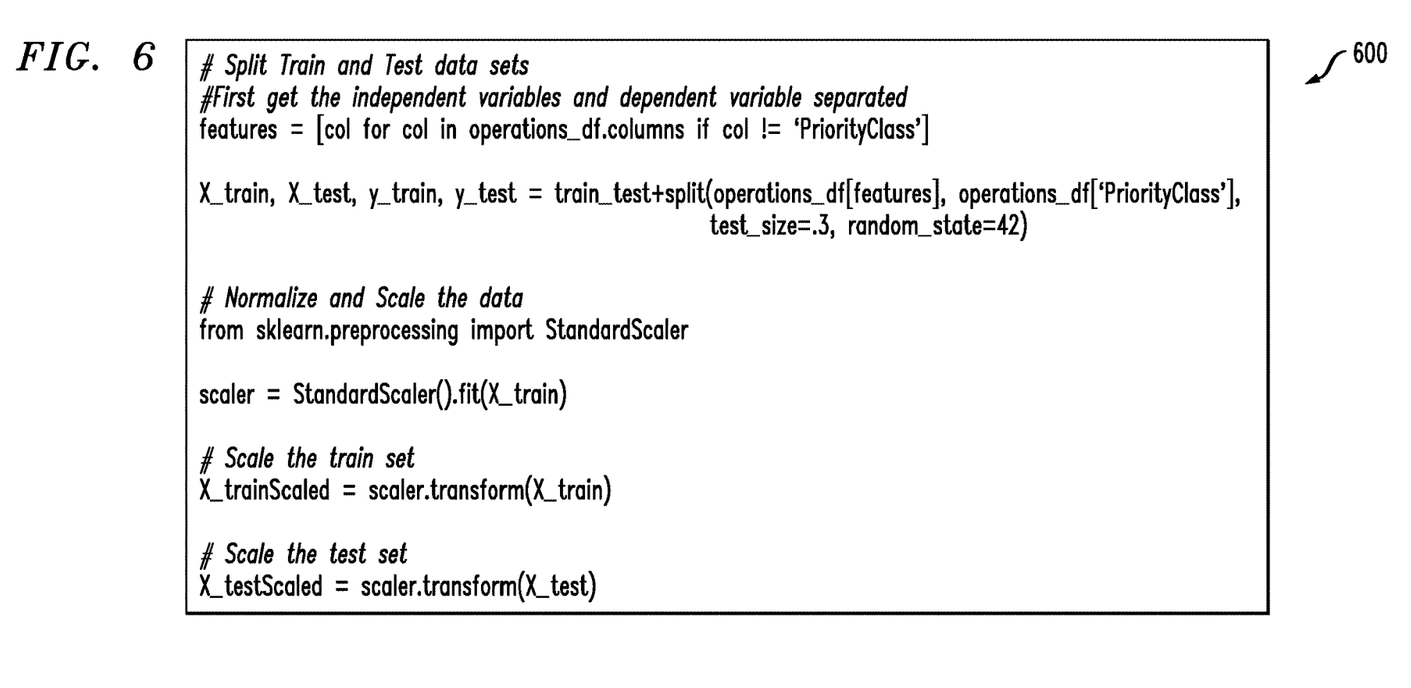
FIG. 6 shows an example code snippet for splitting datasets for training and testing in an illustrative embodiment.

FIG. 6 shows an example code snippet for splitting datasets for training and testing in an illustrative embodiment. In this embodiment, example code snippet 600 is executed by or under the control of at least one processing system and/or device. For example, the example code snippet 600 may be viewed as comprising a portion of a software implementation of at least part of automated cloud environment priority classification system 105 of the FIG. 1 embodiment.

The example code snippet 600 illustrates splitting a dataset into training and testing datasets by using the train_test_split function of the ScikitLearn library (e.g., with a 70%-30% split). Considering implementations of one or more embodiments can represent a regression use case and a dense neural network can be used as the model, such an embodiment includes scaling the data before passing the data to the model. Additionally, in at least one embodiment, the scaling should be performed after the training and testing split is done. This can be achieved by passing training and testing data to a StandardScaler of the ScikitLearn library. At the end of these activities, the data is ready for model training and testing.

It is to be appreciated that this particular example code snippet shows just one example implementation of splitting datasets for training and testing, and alternative implementations of the process can be used in other embodiments.

Figure 7:
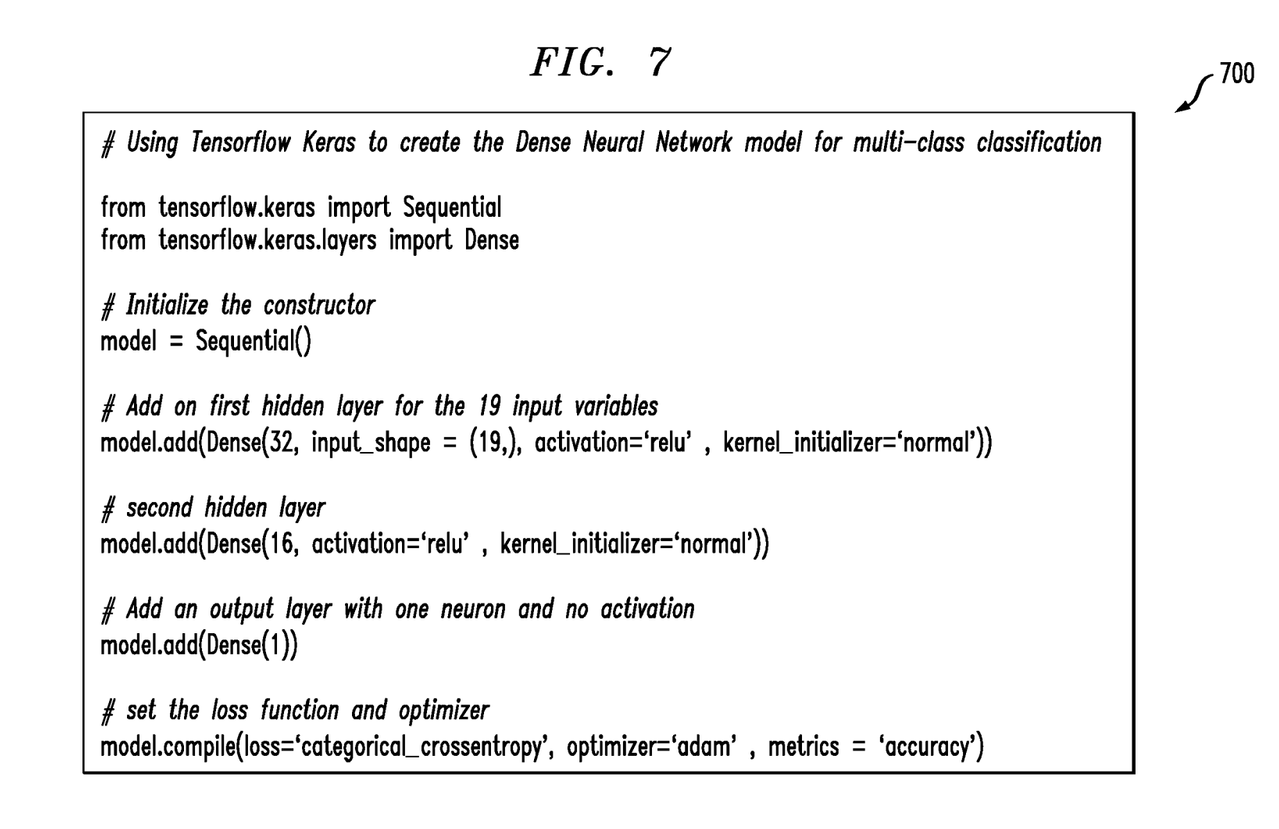
FIG. 7 shows an example code snippet for creating a neural network model in an illustrative embodiment.

FIG. 7 shows an example code snippet for creating a neural network model in an illustrative embodiment. In this embodiment, example code snippet 700 is executed by or under the control of at least one processing system and/or device. For example, the example code snippet 700 may be viewed as comprising a portion of a software implementation of at least part of automated cloud environment priority classification system 105 of the FIG. 1 embodiment.

The example code snippet 700 illustrates using the Tensorflow Keras library to create a dense neural network model for multi-class classification. Using the function Sequential( ) the shell model is created, and then individual layers are added by calling the add( ) function of the model and passing an instance of Dense( ) to indicate that it is a dense neural network. That way, all of the neurons in each layer will connect with all of the neurons from the preceding and following layer(s). This Dense( ) function will accept parameters for the number of neurons on the given layer, the type of activation function used, and if there are any kernel parameters. Multiple hidden layers, as well as the output layer, are added by calling the same add( ) function to the model. Once the model is created, loss function, optimizer type and validation metrics are added to the model using the compile( ) function. In one or more embodiments, for example, "categorical_crossentropy" is used as the loss function, Adam is used as the optimizer, and "accuracy" is used as the metric.

It is to be appreciated that this particular example code snippet shows just one example implementation of creating a neural network model, and alternative implementations of the process can be used in other embodiments.

Figure 8:
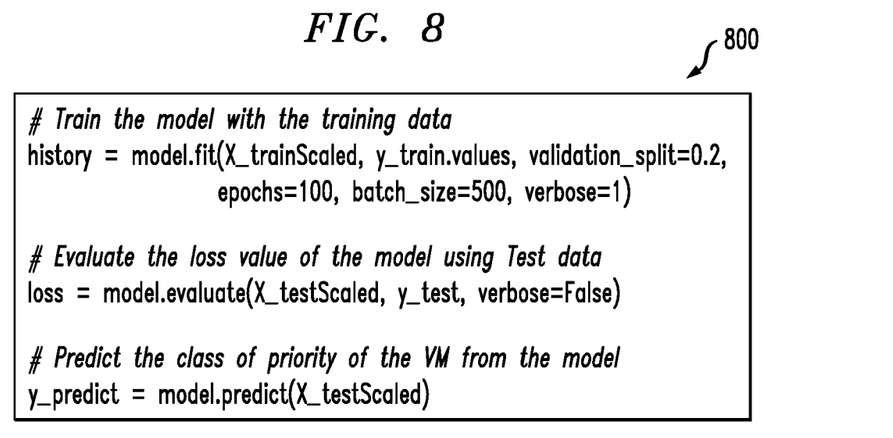
FIG. 8 shows an example code snippet for training, validating, and executing a created neural network model in an illustrative embodiment.

FIG. 8 shows an example code snippet for training, validating, and executing a created neural network model in an illustrative embodiment. In this embodiment, example code snippet 800 is executed by or under the control of at least one processing system and/or device. For example, the example code snippet 800 may be viewed as comprising a portion of a software implementation of at least part of automated cloud environment priority classification system 105 of the FIG. 1 embodiment.

The example code snippet 800 illustrates neural network model training, validation, optimization and prediction. Neural network model training is achieved by calling the fit( ) function of the model and passing training data and the number of epochs. After the model completes the specified number of epochs, the model is trained and ready for validation. The loss/error value can be obtained by calling the evaluate( )function of the model and passing testing data. This loss value indicates how well the model is trained; a higher loss value indicates that the model is not sufficiently trained, such that hyperparameter tuning can be required. Typically, the number of epochs can be increased to train the model more. Other hyperparameter tuning can be carried out by changing the loss function, the optimizer algorithm, and/or making changes to the neural network architecture by adding one or more hidden layers. Once the model is sufficiently trained with a reasonable value of loss (e.g., as close to 0 as possible), the model is ready for prediction. Prediction of the model is achieved by calling the predict( ) function of the model and passing the independent variables of test data (for comparing training data and testing data) or the (real) input values to be used for generating a prediction, and using such data to estimate the expected provisioning time (i.e., the target variable).

It is to be appreciated that this particular example code snippet shows just one example implementation of training, validating, and executing a created neural network model, and alternative implementations of the process can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 9:
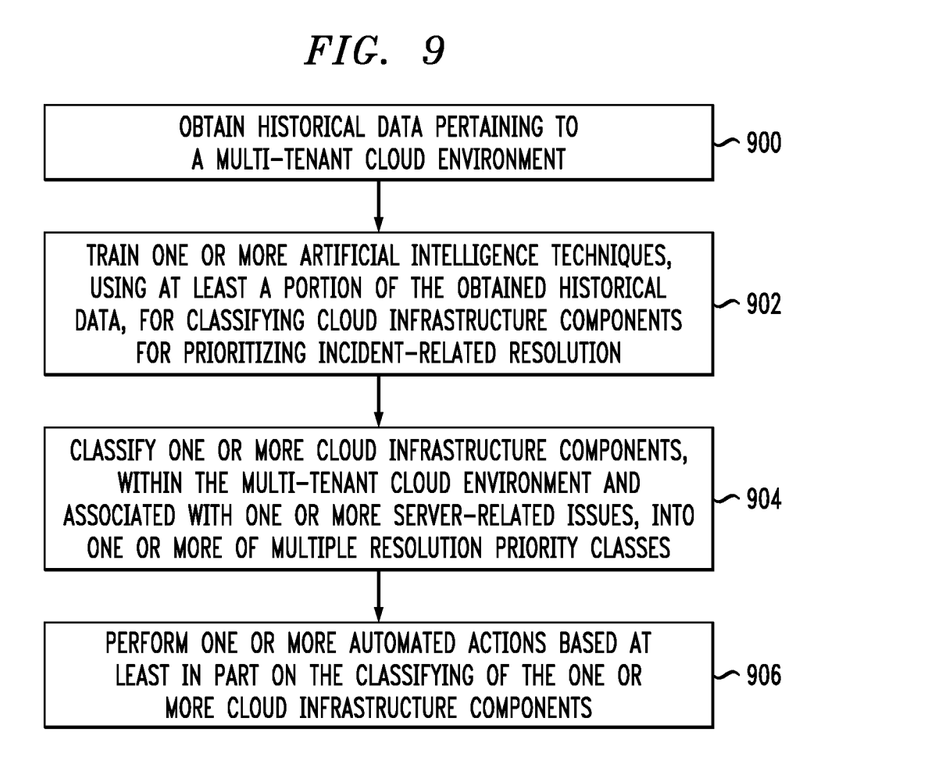
FIG. 9 is a flow diagram of a process for automatically classifying cloud infrastructure components for prioritized multi-tenant cloud environment resolution using artificial intelligence techniques in an illustrative embodiment.

FIG. 9 is a flow diagram of a process for automatically classifying cloud infrastructure components for prioritized multi-tenant cloud environment resolution using artificial intelligence techniques in an illustrative embodiment. It is to be understood that this particular process is only an example, and additional or alternative processes can be carried out in other embodiments.

In this embodiment, the process includes steps 900 through 906. These steps are assumed to be performed by the automated cloud environment priority classification system 105 utilizing elements 112, 114 and 116.

Step 900 includes obtaining historical data pertaining to a multi-tenant cloud environment. In one or more embodiments, obtaining historical data pertaining to a multi-tenant cloud environment includes obtaining one or more of historical data pertaining to types of applications, single instance capability information, high availability capability information, user attributes, and number of cloud infrastructure component instances.

Step 902 includes training one or more artificial intelligence techniques, using at least a portion of the obtained historical data, for classifying cloud infrastructure components for prioritizing incident-related resolution. In at least one embodiment, training one or more artificial intelligence techniques includes training at least one classification-based machine learning algorithm and/or at least one neural network model. In such an embodiment, training at least one neural network model can include training at least one dense artificial neural network-based multi-class classifier comprising an input layer with a plurality of neurons, multiple hidden layers, and an output layer with a plurality of neurons. The input layer with a plurality of neurons can include a number of neurons matching a number of influencing variables associated with training data, and the output layer with a plurality of neurons can include a number of neurons matching a number of classes associated with output the at least one dense artificial neural network-based multi-class classifier.

Step 904 includes classifying one or more cloud infrastructure components, within the multi-tenant cloud environment and associated with one or more server-related issues, into one or more of multiple resolution priority classes. In one or more embodiments, classifying one or more cloud infrastructure components includes classifying at least one of one or more virtual machines and one or more containers. Additionally or alternatively, classifying one or more cloud infrastructure components within the multi-tenant cloud environment and associated with one or more server-related issues can include classifying one or more cloud infrastructure components within the multi-tenant cloud environment and associated with outage of at least one physical server.

Step 906 includes performing one or more automated actions based at least in part on the classifying of the one or more cloud infrastructure components. In at least one embodiment, performing one or more automated actions includes automatically performing one or more resolution-related actions in accordance with the classifying of the one or more cloud infrastructure components. In such an embodiment, performing one or more automated actions can also include automatically retraining the one or more artificial intelligence techniques based at least in part on results of the one or more resolution-related actions.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically classify incidents for prioritized multi-tenant cloud environment resolution using artificial intelligence techniques. These and other embodiments can effectively overcome problems associated with conventional cloud environment resolution techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
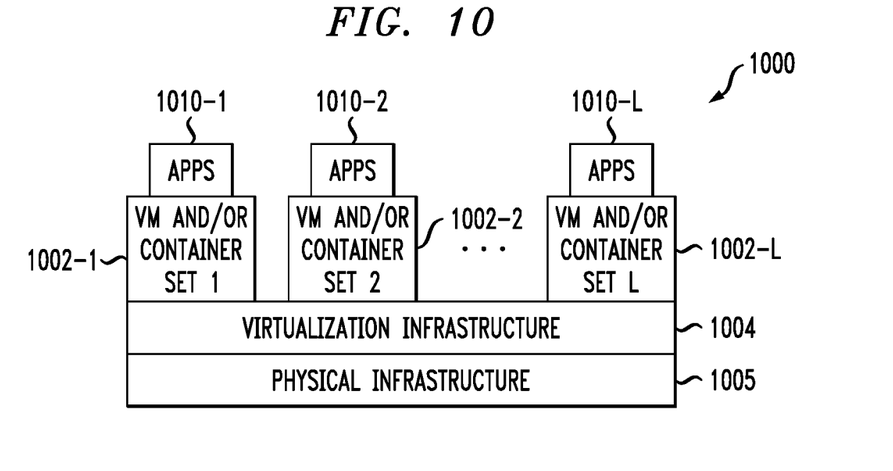
FIGS. 10 and 11 show examples of processing platforms that may be utilized to implement at least a portion of an information processing system in illustrative embodiments.
Figure 11:
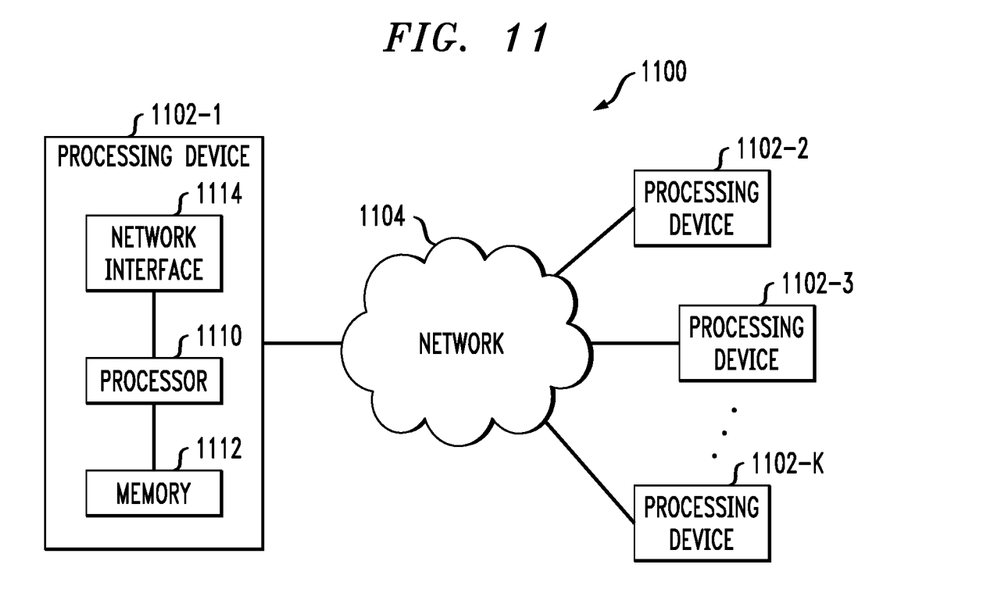

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple VMs and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a CPU, a GPU, a TPU, a microcontroller, an ASIC, a FPGA or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining historical data pertaining to a multi-tenant cloud environment;
   training one or more artificial intelligence techniques, using at least a portion of the obtained historical data, for classifying a plurality of cloud infrastructure components within the multi-tenant cloud environment for prioritizing incident-related resolution;
   classifying, using the one or more artificial intelligence techniques, at least a portion of the plurality of cloud infrastructure components, within the multi-tenant cloud environment and associated with one or more server-related issues, into one or more of multiple resolution priority classes; and
   performing one or more automated actions based at least in part on the classifying of the portion of the plurality of cloud infrastructure components, wherein performing the one or more automated actions comprises automatically generating a sequence of operations for addressing issues associated with the portion of the plurality of cloud infrastructure components based at least in part on the classifying;
   wherein the method is performed by at least one processing device comprising a processor coupled to a memory.

2. The computer-implemented method of claim 1, wherein training one or more artificial intelligence techniques comprises training at least one neural network model.

3. The computer-implemented method of claim 2, wherein training at least one neural network model comprises training at least one dense artificial neural network-based multi-class classifier comprising an input layer with a plurality of neurons, multiple hidden layers, and an output layer with a plurality of neurons.

4. The computer-implemented method of claim 3, wherein the input layer with a plurality of neurons comprises a number of neurons matching a number of influencing variables associated with training data.

5. The computer-implemented method of claim 3, wherein the output layer with a plurality of neurons comprises a number of neurons matching a number of classes associated with output the at least one dense artificial neural network-based multi-class classifier.

6. The computer-implemented method of claim 1, wherein performing one or more automated actions comprises automatically performing one or more resolution-related actions in accordance with the classifying of the portion of the plurality of cloud infrastructure components.

7. The computer-implemented method of claim 6, wherein performing one or more automated actions comprises automatically retraining the one or more artificial intelligence techniques based at least in part on results of the one or more resolution-related actions.

8. The computer-implemented method of claim 1, wherein obtaining historical data pertaining to a multi-tenant cloud environment comprises obtaining one or more of historical data pertaining to types of applications, single instance capability information, high availability capability information, user attributes, and number of cloud infrastructure component instances.

9. The computer-implemented method of claim 1, wherein training one or more artificial intelligence techniques comprises training at least one classification-based machine learning algorithm.

10. The computer-implemented method of claim 1, wherein classifying the at least a portion of the plurality of cloud infrastructure components comprises classifying at least one of one or more virtual machines and one or more containers.

11. The computer-implemented method of claim 1, wherein classifying the at least a portion of the plurality of cloud infrastructure components comprises classifying the portion of the plurality of cloud infrastructure components within the multi-tenant cloud environment and associated with an outage of at least one physical server.

12. A non-transitory processor-readable storage medium having stored therein program code of one or more software programs, wherein the program code when executed by at least one processing device causes the at least one processing device:
to obtain historical data pertaining to a multi-tenant cloud environment;
to train one or more artificial intelligence techniques, using at least a portion of the obtained historical data, for classifying a plurality of cloud infrastructure components within the multi-tenant cloud environment for prioritizing incident-related resolution;
to classify, using the one or more artificial intelligence techniques, at least a portion of the plurality of cloud infrastructure components, within the multi-tenant cloud environment and associated with one or more server-related issues, into one or more of multiple resolution priority classes; and
to perform one or more automated actions based at least in part on the classifying of the portion of the plurality of cloud infrastructure components, wherein performing the one or more automated actions comprises automatically generating a sequence of operations for addressing issues associated with the portion of the plurality of cloud infrastructure components based at least in part on the classifying.

13. The non-transitory processor-readable storage medium of claim 12, wherein training one or more artificial intelligence techniques comprises training at least one neural network model.

14. The non-transitory processor-readable storage medium of claim 13, wherein training at least one neural network model comprises training at least one dense artificial neural network-based multi-class classifier comprising an input layer with a plurality of neurons, multiple hidden layers, and an output layer with a plurality of neurons.

15. The non-transitory processor-readable storage medium of claim 12, wherein performing one or more automated actions comprises automatically performing one or more resolution-related actions in accordance with the classifying of the portion of the plurality of cloud infrastructure components.

16. The non-transitory processor-readable storage medium of claim 15, wherein performing one or more automated actions comprises automatically retraining the one or more artificial intelligence techniques based at least in part on results of the one or more resolution-related actions.

17. An apparatus comprising:
at least one processing device comprising a processor coupled to a memory;
the at least one processing device being configured:
to obtain historical data pertaining to a multi-tenant cloud environment;
to train one or more artificial intelligence techniques, using at least a portion of the obtained historical data, for classifying a plurality of cloud infrastructure components within the multi-tenant cloud environment for prioritizing incident-related resolution;
to classify, using the one or more artificial intelligence techniques, at least a portion of the plurality of cloud infrastructure components, within the multi-tenant cloud environment and associated with one or more server-related issues, into one or more of multiple resolution priority classes; and
to perform one or more automated actions based at least in part on the classifying of the portion of the plurality of cloud infrastructure components, wherein performing the one or more automated actions comprises automatically generating a sequence of operations for addressing issues associated with the portion of the plurality of cloud infrastructure components based at least in part on the classifying.

18. The apparatus of claim 17, wherein training one or more artificial intelligence techniques comprises training at least one neural network model.

19. The apparatus of claim 18, wherein training at least one neural network model comprises training at least one dense artificial neural network-based multi-class classifier comprising an input layer with a plurality of neurons, multiple hidden layers, and an output layer with a plurality of neurons.

20. The apparatus of claim 17, wherein performing one or more automated actions comprises automatically performing one or more resolution-related actions in accordance with the classifying of the portion of the plurality of cloud infrastructure components.

* * * * *

UNITED STATES PATENT AND TRADEMARK OFFICE
CERTIFICATE OF CORRECTION

PATENT NO. : 11,829,234 B2
APPLICATION NO. : 17/579104
DATED : November 28, 2023
INVENTOR(S) : Bijan Kumar Mohanty et al.

It is certified that error appears in the above-identified patent and that said Letters Patent is hereby corrected as shown below:

In the Claims

In Claim 5, Column 16, Lines 53-57, replace:
"The computer-implemented method of claim 3, wherein the output layer with a plurality of neurons comprises a number of neurons matching a number of classes associated with output the at least one dense artificial neural network-based multi-class classifier."

With:
-- The computer-implemented method of claim 3, wherein the output layer with a plurality of neurons comprises a number of neurons matching a number of classes associated with output of the at least one dense artificial neural network-based multi-class classifier. --

Signed and Sealed this
Twentieth Day of February, 2024

Katherine Kelly Vidal
*Director of the United States Patent and Trademark Office*